Nov. 1, 1932. L. M. SERRA 1,885,557
ROTARY ENGINE
Filed Dec. 27, 1929 5 Sheets-Sheet 1

Luigi M. Serra
INVENTOR
BY Victor J. Evans
ATTORNEY

Nov. 1, 1932.  L. M. SERRA  1,885,557
ROTARY ENGINE
Filed Dec. 27, 1929  5 Sheets-Sheet 2

Luigi M. Serra
INVENTOR
BY Victor J. Evans
ATTORNEY

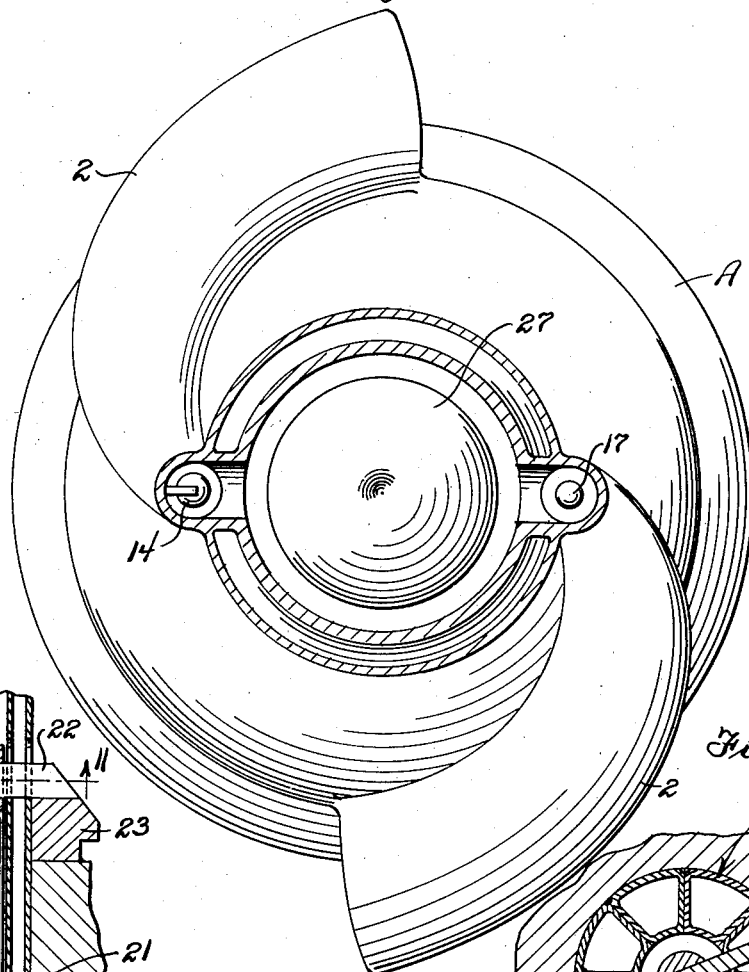
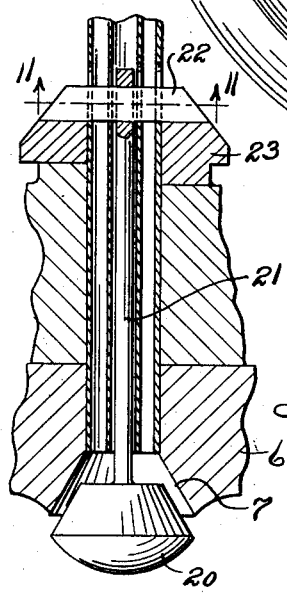
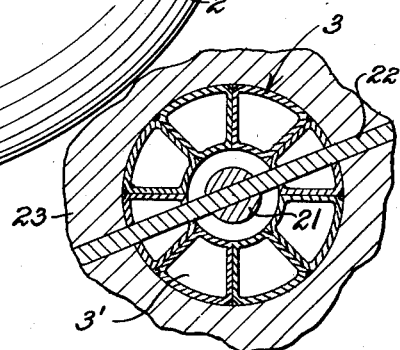

Nov. 1, 1932.  L. M. SERRA  1,885,557
ROTARY ENGINE
Filed Dec. 27, 1929  5 Sheets-Sheet 5

Luigi M. Serra
INVENTOR
BY Victor J. Evans
ATTORNEY

Patented Nov. 1, 1932

1,885,557

UNITED STATES PATENT OFFICE

LUIGI M. SERRA, OF ROME, ITALY

ROTARY ENGINE

Application filed December 27, 1929. Serial No. 416,958.

This invention relates to a rotary internal combustion engine designed for an aircraft, the general object of the invention being to make the engine of the turbine type and to so arrange and construct the parts that the engine will have the greatest efficiency with the minimum amount of fuel.

Another object of the invention is to provide means whereby the propeller is carried directly by a rotary part of the engine so as to eliminate transmission means and to so arrange the exterior part of the engine that the air currents will not offer resistance to the rotary motion.

A still further object of the invention is to provide means whereby the explosions of the explosive charges will compress the charges to be introduced into the combustion chamber.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a section on line 3—3 of Figure 2.

Figure 10 is an enlarged detail sectional view through the valve means and the operating means for the same.

Figure 11 is a section on line 11—11 of Figure 10.

Figure 1:
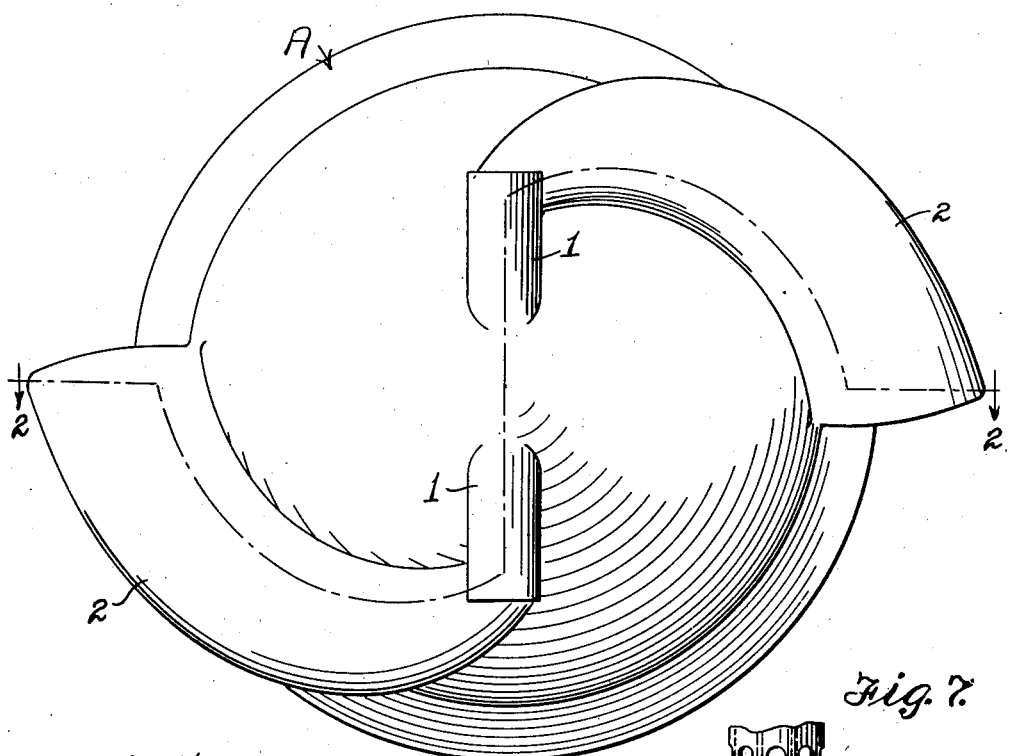
Figure 1 is a front view of the engine.
Figure 6:
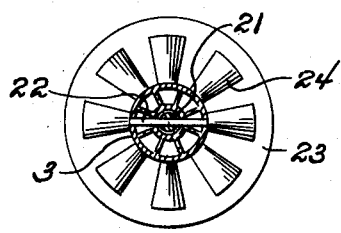
Figure 6 is a section on line 6—6 of Figure 2.
Figure 7:
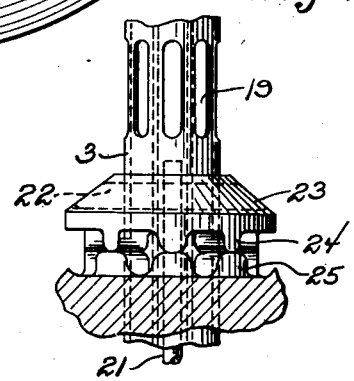
Figure 7 is an elevation, with parts in section, of the cam means and also showing the slots or ports in the stationary tubular shaft.
Figure 2:
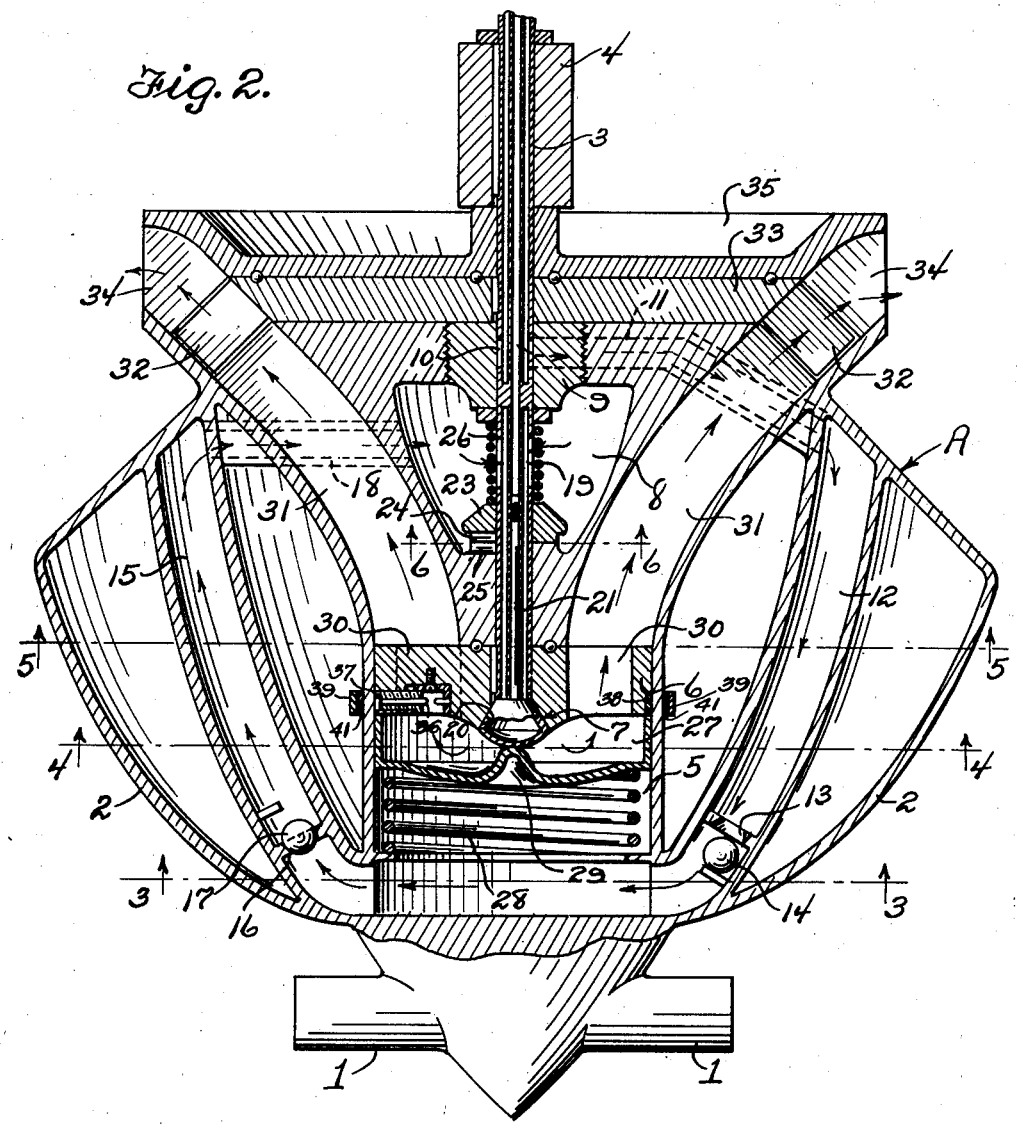
Figure 2 is a section on line 2—2 of Figure 1.
Figure 4:
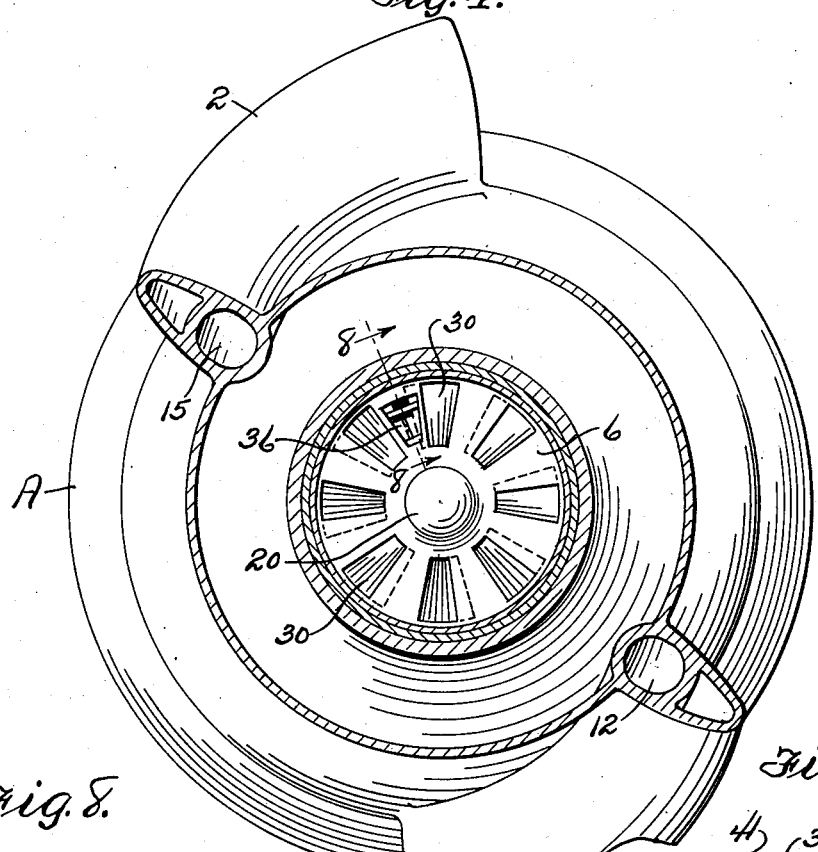
Figure 4 is a section on line 4—4 of Figure 2.
Figure 8:
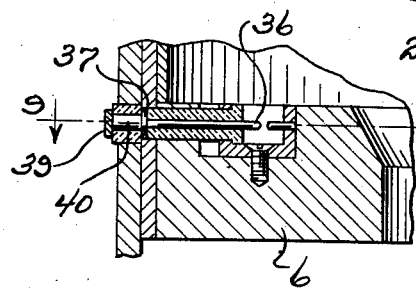
Figure 8 is a section on line 8—8 of Figure 4.
Figure 9:
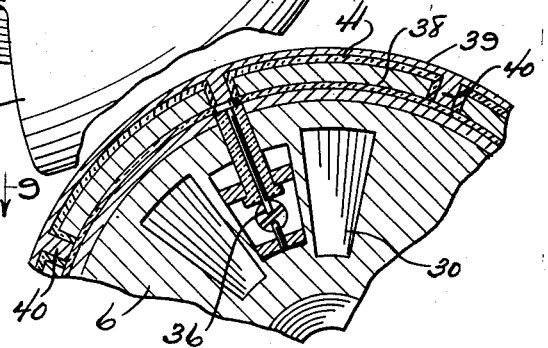
Figure 9 is a section on line 9—9 of Figure 8.

In these views, the letter A indicates the engine as a whole and as will be seen, the engine is of substantially conical form with a pair of opposed members 1 adjacent its small end for carrying the blades of a propeller. A pair of vanes 2 is formed with or connected to the exterior wall of the engine, each vane being of hollow construction and of arc shape and substantially spirally arranged on the exterior wall of the engine. The small end of each vane terminates a slight distance in rear of a socket member 1, with its large end sloping rearwardly to the point where it connects with the rear part of a side of the engine. These vanes are entirely closed. The rotary parts of the engine are mounted on a stationary hollow shaft 3 suitably supported by the craft and projecting from the front end thereof, a portion of the supporting means being shown at 4 in Figure 2. As will be understood, the engine forms the nose of the craft.

A cylinder 5 is located in the forward end of the engine and a stationary member 6 is located in the rear end of said cylinder. This member is keyed or otherwise fastened to the front end of the shaft 3 and has a valve seat 7 at its center in which the front end of the shaft 3 terminates. A chamber 8 is formed in the central part of the body and this chamber is closed by a closure member 9 which is screwed in an opening formed in the rear part of the body, this member 9 being rotatably arranged on the shaft. The part of the shaft surrounded by the member 9 has a plurality of ports 10 therein which will register with a passage 11 in the rear part of the body of the engine during the rotation of the body.

A passage 12 is formed in one of the vanes and the passage 11 communicates with the rear part of this passage 12 and the front part of this passage 12 communicates with the front end of the cylinder 5 through means of a port 13 which is controlled by a ball valve 14. A passage 15 is formed in the other vane and communicates with the cylinder through means of a port 16 controlled by a ball valve 17. A passage 18 connects the rear end of the passage 15 with the chamber 8. The rear part of the hollow shaft 3 is connected with a carbureter or the like not shown, so that the explosive mixture will pass through the shaft and through the ports 10 in the passage 11 and from this passage 11, the mixture will pass through the passage 12 into the cylinder and from the cylinder, the mixture will pass through the passages 15 and 18 into the chamber 8. That part of the shaft within the chamber 8 is formed with ports 19 through which the mixture will pass into the shaft and then the mixture will pass from the shaft through the valve seat 7 into the rear end of the cylinder. The escape of mixture from the front end of the shaft is controlled by a valve 20 which engages the seat and the stem 21 of which extends rearwardly into the shaft, where it is connected by a key 22 to a trip member 23 located in the front end of the chamber 8. The key passes through slots in the shaft so that the trip member is held stationary with the shaft. This trip member is formed with the tripping teeth 24 and the front wall of the chamber 8 is formed with the cooperating tripping teeth 25. A spring 26 encircles that part of the shaft within the chamber 8 and tends to press the trip member forwardly to hold the valve in open position, but during the rotation of the body, the teeth 25 will engage the teeth 24 and thus force the trip 23 rearwardly and thus close the valve. As soon as the teeth 25 ride off the teeth 24, the spring will act to open the valve. Thus the mixture in the chamber 8 is permitted to pass into the cylinder in successive charges. A piston 27 of cup shape is arranged in the cylinder and is normally held against the rear end thereof or against the member 6 by a spring 28 in the cylinder. A teat 29 extends rearwardly from the central part of the piston and engages the valve 20 so that when the valve is forced from its seat, the piston is pressed forwardly against the action of its spring. This will act to compress the gas in the cylinder when the engine is being started so that the gas will force the valve 17 off its seat and thus permit the gas to flow through the passages 15 and 18 into the chamber 8.

The stationary member 6 is formed with the diagonally arranged ports 30 which act to direct the expanding gases resulting from the ignition of the explosive mixture in the rear part of the cylinder against the walls of the passages 31 formed in that part of the body in rear of said member 6. These passages are of parabolic shape and gradually increase in width from their front ends to their rear ends. The passages also curve outwardly and rearwardly from their front ends.

The gases leaving the passages 31 act against the blades 32 carried by the stationary member 33 which is keyed or otherwise fastened to the shaft 3, and after passing these blades, the gases pass through the openings 34 formed in the rear part 35 of the body and thus escape into the atmosphere. This part 35 is rotatably arranged on the shaft and forms with the rest of the body a space to receive the stationary member 3 and its diagonal blades 32.

The shaft 3 is preferably formed as shown in Figure 11, which shows the shaft composed of a number of hollow sectors 3' welded or otherwise connected together. This arrangement provides a plurality of passages in the shaft for the explosive mixture.

Figure 5:
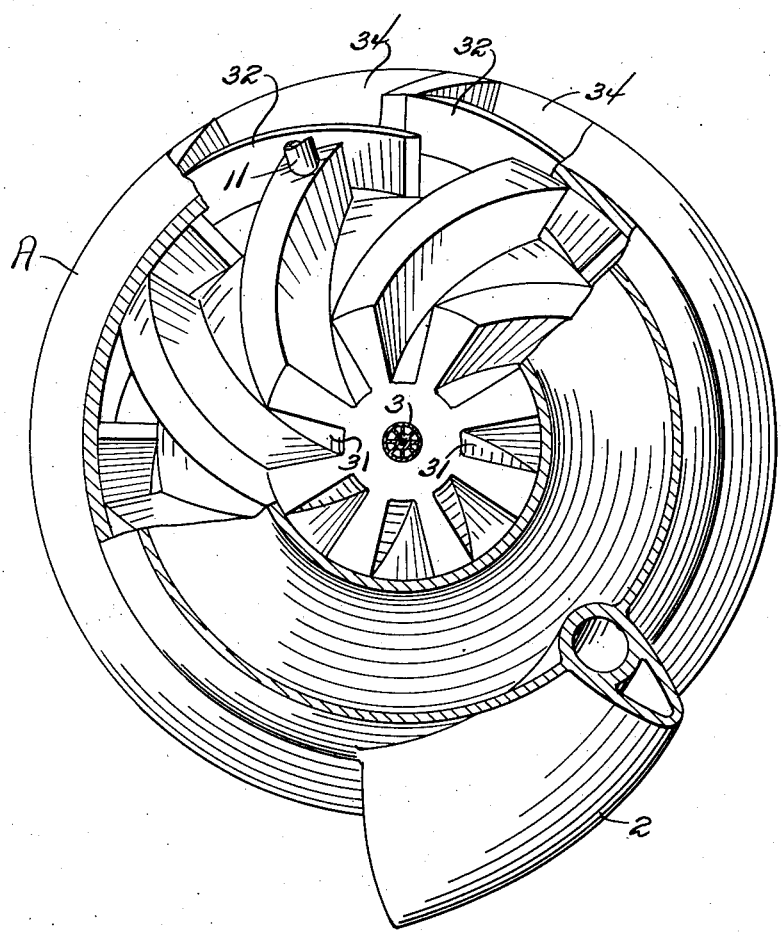
Figure 5 is a section on line 5—5 of Figure 2.

From the foregoing it will be seen that the explosive mixture introduced into the hollow shaft 3 will pass through the ports 10 into the passage 11 during the rotation of the rotor or body of the engine and from the passage 11, the mixture will pass through the passage 12 into the cylinder and from the cylinder, the mixture will pass through the passages 15 and 18 into the chamber 8 and when the valve 20 is opened, the mixture will pass from the chamber through the ports 19 into the forward part of the hollow shaft and past the valve into the rear part of the cylinder, where the charge is exploded by means hereinafter to be described. The force of the explosion will drive the piston 27 forwardly against the action of its spring 28, thus compressing the gases in the forward part of the cylinder and causing them to open the valve 17 and flow through the passages 15 and 18 into the chamber 8. The gases resulting from the explosion of the mixture will pass through the diagonally arranged ports 30 of the stationary member 6 and then into the passages 31 and due to the arrangement of the walls of the passages 31, the gases will impart a rotary movement to the body or rotor, as such walls act as turbine blades. When the trip teeth 25 raise teeth 24 this closes valve 20 and at this moment the communication between ports 30 and passages 31 is cut off and immediate ignition takes place through the spark plug 36 so that piston 27 is driven outwardly compressing the fresh gases in the cylinder 5 with the flow of such gases into passages 15 and 18 for delivery into chamber 8 while exploded gases then pass from ports 30 to said passages 31 through the spaces between the stationary blades 32 and then act on the blades 34 of the part 35 and finally escape into the atmosphere. As shown in Figure 5, the passages 31 are of gradually increasing width from their front ends to their rear ends so as to secure the maximum propelling effect from the expanding gases passing through them and an additional propelling effect is secured from the gases just before the escape into the atmosphere by the action on the blades 34.

The spark plug 36 is carried by the front face of the stationary member 6 and has its head 37 arranged in an opening formed in a ring 38 of non-conducting material countersunk in the outer circumference of the member 6 and a part of the rotor or body of the motor carries a ring 39 of conducting material which carries a plurality of projections 40 extending through holes in a part of the rotor and having their inner ends contacting the ring 38. The ring 39 and its projections 40 are insulated from the rotor, as shown at 41. Thus during the rotation of the rotor or body of the motor, the projections 40 contact successively the head of the spark plug so as to complete the circuit to the plug and cause the spark to occur at intervals to explode the charge of mixture. Of course, the ring 39 must be connected with a suitable source of current and the second part of the plug must be grounded.

As before stated, the blades are connected directly with the rotary part of the engine and the formation of the exterior part of the motor and the arrangement of the vanes 2 will not offer resistance to air currents during the flight of the craft. The vanes are hollow so that the air, acting against the comparatively large surfaces of the vanes and the motor, acts to cool the same.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A motor of the class described comprising a stationary supporting member, a body rotatably arranged on said member and having a part thereof forming a cylinder, a chamber in the body, means for connecting the chamber with the cylinder, means for introducing explosive charges into the cylinder, valve controlled means for leading the mixture from the chamber into the cylinder, a piston in the cylinder acted on by the explosions for compressing the mixture in the cylinder and forcing it into the chamber, ignition means in the cylinder and means for actuating the valve by the rotary movement of the body and movable blades acted on by the exploded gases for rotating the body.

2. A motor of the class described comprising a hollow stationary shaft, a body rotatably arranged thereon and provided with a cylinder, a ported member attached to the shaft and located in one end of the cylinder, turbine passages in the body communicating with the ports and with the atmosphere, a member attached to the shaft and having stationary blades thereon intersecting the passages, a chamber in the body surrounding a part of the shaft, said part of the shaft having ports therein for connecting the chamber with the cylinder, a valve for controlling the escape of mixture from the shaft into the cylinder, trip means for actuating the valve, means for connecting the cylinder with the chamber, a passage for connecting the cylinder with a second part of the shaft, check valves arranged in said passage for controlling the flow of mixture into and from the cylinder said part of the shaft having ports therein whereby when an explosive mixture is introduced into the shaft, said mixture will pass through the ports and the passage into the cylinder, ignition means for exploding the gas introduced into the cylinder by the opening of the valve, and a spring pressed piston in the cylinder and separating the ported member from the inlet passage and acted on by the explosions to compress the gas and force it into the chamber, the expansible gases resulting from the explosions passing through the turbine passages to rotate the body.

3. A motor of the class described comprising a hollow stationary shaft, the interior of which is divided into a rear portion and a front portion, ports in each portion, a ported member attached to the shaft and having a valve seat communicating with the front end of the shaft, a body rotatably arranged on the shaft and provided with a cylinder in the rear end of which the ported member fits, a spring actuated piston in the cylinder, normally resting against the ported member, the front end of the cylinder having inlet and outlet ports therein, a chamber in the body surrounding the ports in the front part of the shaft, a passage in the body connecting the chamber with the outlet port of the cylinder, a second passage connecting the inlet port with the ports in the rear part of the shaft, a valve having its stem extending into the front part of the shaft with its head engaging the seat, spring means for normally holding the valve off the seat, trip means for causing the rotary movement of the body to seat the valve, means for igniting the mixture introduced into the rear end of the cylinder, the explosive forces causing the piston to compress the mixture in the front end of the cylinder and force the same into the chamber, means for introducing an explosive mixture into the rear part of the shaft and turbine passages in the body receiving the exploded gases from the ports in the ported member.

4. A motor of the character described, comprising a stationary member, a body rotatably arranged on said member and forming a cylinder and also a chamber spaced from the cylinder, means for establishing communication between the cylinder and said chamber, means for introducing explosive charges into the cylinder, valve mechanism for admitting mixture from the chamber into the cylinder, a tension piston in the cylinder and acted upon by the explosions for compressing the mixture in the cylinder and forcing it into the chamber, ignition means in the cylinder, trip mechanism connected with the body and said valve for actuating the latter on rotary movement of the body and turbine vanes arranged in the body and acted upon by the exploded charges for rotating the latter.

5. A motor of the character described, comprising a stationary member, a body rotatably arranged on said member and forming a cylinder and also a chamber spaced from the cylinder, means for establishing communication between the cylinder and said chamber, means for introducing explosive charges into the cylinder, valve mechanism for admitting mixture from the chamber into the cylinder, a tension piston in the cylinder and acted upon by the explosions for compressing the mixture in the cylinder and forcing it into the chamber, ignition means in the cylinder, trip mechanism connected with the body and said valve for actuating the latter on rotary movement of the body, turbine vanes arranged in the body and acted upon by the exploded charges for rotating the latter, and valve mechanism in the body for controlling the flow of mixture to and from the cylinder.

In testimony whereof I affix my signature.

LUIGI M. SERRA.